Jan. 6, 1942.            C. BAUMGARTNER            2,268,920
                    HOLDER FOR FISHING TACKLE
                        Filed June 13, 1940
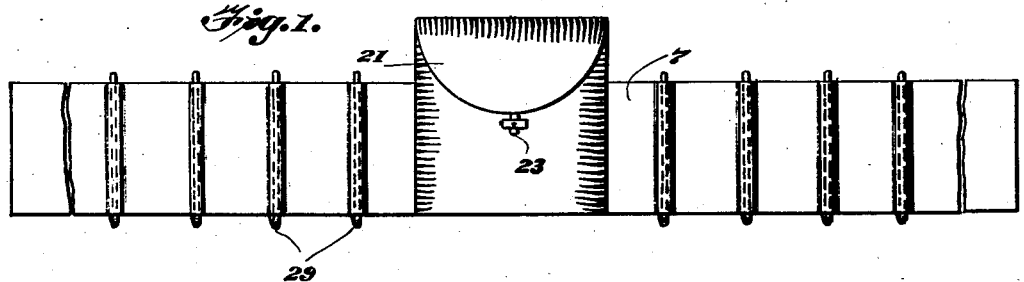
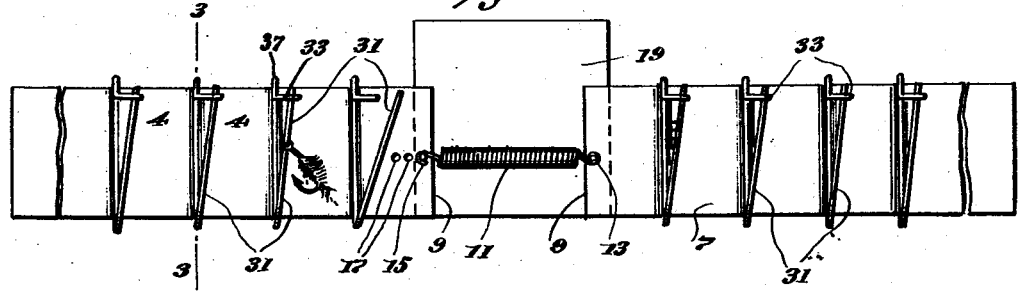
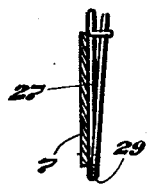
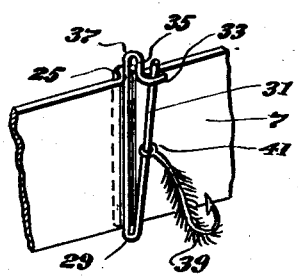
Inventor
CLARENCE BAUMGARTNER
By L. Edw. Doherty
Attorney Patented Jan. 6, 1942

2,268,920

UNITED STATES PATENT OFFICE 2,268,920

HOLDER FOR FISHING TACKLE

Clarence Baumgartner, Iron River, Mich., assignor of twenty-five per cent to James Haydon, Iron River, Mich.

Application June 13, 1940, Serial No. 340,369

3 Claims. (Cl. 43—32)

The present invention relates to improvements in holders for fishing tackle and the like.

The primary object of the invention is to provide a holder for fishing tackle which may be attached to the fisherman's hat for holding fishing flies, hooks and other fishing tackle in such a manner that the tackle will be at all times exposed to the atmosphere whereby the fishing flies will be held so that the fisherman may easily select the bait desired and the tackle will be kept dry and in good condition.

A further object of the invention is to provide a holder for fishing flies and other tackle which may be readily attached to a fisherman's hat and may be applied to hats of various sizes without requiring adjustments or fastening means of a cumbersome nature.

A still further object of the invention is to provide a fishing tackle holder which may be applied to a fisherman's hat, which holder is provided with a leather case or receptacle for receiving miscellaneous articles such as fishermen's licenses or small hooks.

Other objects and advantages of the invention will become apparent during the course of the following description of the accompanying drawing wherein:

Figure 1 is a rear elevational view of the device, embodying the invention,

Figure 2 is a front elevational view of the same illustrating the tackle holding hooks secured to the band in spaced relation thereon.

Figure 3 is a vertical cross sectional view taken on line 3—3 of Figure 2 looking in the direction of the arrows, illustrating in detail one of the tackle holding hooks.

Figure 4 is a fragmentary top plan view further illustrating in detail the manner in which the tackle holding hooks are anchored in place, and Figure 5 is a perspective view illustrating the manner in which one of the tackle holding hooks is adapted to support a fishing fly hook.

In the drawing, wherein for the purpose of illustrating the invention and wherein like reference characters will be employed to designate like parts throughout the same, the reference character 7 will generally be employed to designate a metal band formed of brass or the like having sufficient resilient qualities to be bent in a circular fashion so that the band may encircle a hat or cap. The free ends 9 of the band are joined by means of a coil spring 11 secured to one end of the band as at 13 and having the other end provided with a hook 15 for being passed over adjustable pins 17.

The coil spring 11 may have its hooked end 15 secured to one of the pins 17 so that the band may be adjusted on hats of various sizes. Interposed between the free ends of the band 7 is a cloth or leather receptacle 19 fastened in place by an adhesive or rivets and said receptacle is provided with a closure flap 21 fastened in place by a latch 23. The receptacle 19 may be secured in place while the coil spring 11 is extended so that the size of the band may be increased without causing the receptacle 19 to be torn loose from its fastening.

Formed at spaced intervals on the metal band 7 is a series of transverse recesses 25 formed by bending the metal on itself transversely of the length thereof. When the transverse grooves are thus formed, fishing tackle hooks may have their base portion as at 27 secured in place therein and held by soldering the hooks in place.

Each hook comprises in addition to the base portion 27, a return bent portion 29 terminating in a substantially parallel prong 31, the free end of which may be received in a loop 33 formed on an extension 35 of a return bent portion 37. It will be noted that the loop 33 is adapted to receive the free end of the prong 31 and as shown in Figure 5, a fish hook 39 may be secured to one of the prongs 31 by threading the hook 41 thereof thereon.

If desired, fishing flies having long leaders may have the hook portion thereof received in one of the tackle receiving hooks while the leader is passed around the band so that the loop on the leader may be received on one of the fishing tackle receiving hooks 31.

If desired, the tackle holding hook prong 31 may be arranged so that it will be received on different sides of the loop 33 such as by positioning the hooks so that the loops 33 extend in one direction while others extend in the opposite direction.

It is to be understood, that the form of the invention herewith shown and described is to be taken as a preferred embodiment of the same and that various changes in the shape, size and arrangement of parts may be resorted to without departing from the spirit of the invention or the scope of the subjoined claims.

What is claimed is:

1. A fishing tackle holder comprising a metal band having a series of transverse depressions, fishing tackle receiving hooks having their base portions anchored in the depressions and means for holding the free ends of the band together.

2. A fishing tackle holder comprising a metal band having a series of transverse depressions, fishing tackle receiving hooks having their base portions anchored in the band depressions, means for adjustably holding the free ends of the band together and a receptacle secured to the free ends of the band and bridging the space therebetween.

3. A fishing tackle holder comprising a metal band having a series of transverse depressions forming grooves, fishing tackle receiving hooks anchored in the grooves at the base portions thereof, a coil spring for resiliently holding the free ends of the band together and a flexible receptacle secured to the free ends of the band bridging the space therebetween and having sufficient slack to allow free expansion of the coil spring.

CLARENCE BAUMGARTNER.